United States Patent
Waseda

(10) Patent No.: US 8,177,438 B2
(45) Date of Patent: May 15, 2012

(54) DOUBLE ROW THRUST ROLLER BEARING

(75) Inventor: Yoshitaka Waseda, Nisshin (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 809 days.

(21) Appl. No.: 12/219,523

(22) Filed: Jul. 23, 2008

(65) Prior Publication Data
US 2009/0028481 A1    Jan. 29, 2009

(30) Foreign Application Priority Data
Jul. 25, 2007   (JP) ................ P2007-193240

(51) Int. Cl.
*F16C 33/48*    (2006.01)
*F16C 33/51*    (2006.01)
*F16C 33/58*    (2006.01)

(52) U.S. Cl. ........ 384/621; 384/623; 384/420; 384/569; 384/608

(58) Field of Classification Search .......... 384/420, 384/608, 619, 620, 623, 569, 564, 572
See application file for complete search history.

(56) References Cited

U.S. PATENT DOCUMENTS

| | | | |
|---|---|---|---|
| 2,959,458 A * | 11/1960 | Kaye | 384/608 |
| 4,953,993 A * | 9/1990 | Bahr | 384/623 |
| 5,009,523 A * | 4/1991 | Folger et al. | 384/475 |
| 5,017,025 A * | 5/1991 | Williams | 384/584 |
| 5,121,998 A * | 6/1992 | Bhatia | 384/539 |
| 5,492,419 A * | 2/1996 | Miller et al. | 384/489 |
| 6,457,870 B2 * | 10/2002 | Aizawa et al. | 384/477 |
| 6,561,559 B1 * | 5/2003 | Skiller et al. | 295/36.1 |
| 7,033,083 B2 * | 4/2006 | Obayashi et al. | 384/619 |
| 2004/0091193 A1 * | 5/2004 | Obayashi et al. | 384/623 |
| 2006/0110086 A1 * | 5/2006 | Morita et al. | 384/448 |
| 2006/0153485 A1 * | 7/2006 | Maeda et al. | 384/569 |

FOREIGN PATENT DOCUMENTS

| | | | |
|---|---|---|---|
| JP | 2006017201 A | * | 1/2006 |
| JP | 2006125427 A | * | 5/2006 |
| JP | 2006-194292 | | 7/2006 |
| JP | 2007-224978 | | 8/2007 |

* cited by examiner

*Primary Examiner* — Marcus Charles
(74) *Attorney, Agent, or Firm* — McGinn IP Law Group, PLLC

(57) ABSTRACT

A double row thrust roller bearing includes a pair of inner and outer cages arranged radially in two rows in separate coaxial relation, each cage including an annular inner peripheral wall, an annular outer peripheral wall, a plurality of pillar portions interconnecting the annular inner and outer peripheral walls at intervals in a circumferential direction thereof, and a plurality of pockets each formed between the adjacent pillar portions. Rollers are rotatably held and retained respectively in the pockets. The annular inner peripheral wall of the inner cage is guided by an annular flange formed at an inner peripheral edge of one race, and the annular inner peripheral wall of the outer cage is guided at an inner periphery thereof by the annular outer peripheral wall of the inner cage.

14 Claims, 5 Drawing Sheets

DOUBLE ROW THRUST ROLLER BEARING

BACKGROUND OF THE INVENTION

1. Field of the Invention

This invention relates to a double row thrust roller bearing in which a pair of inner and outer cages are arranged radially in two rows in separate coaxial relation, and each cage has a plurality of rollers rotatably held and retained respectively in pockets thereof.

2. Related Art

A double row thrust roller bearing of the type described is disclosed in JP-A-2007-224978 which was filed in Japanese Patent Office earlier by the present inventor. As shown in FIGS. 4 and 5, this double row thrust roller bearing includes a pair of inner and outer cages 20 and 120 arranged radially in two rows in separate coaxial relation. The radially-inner cage 20 includes an annular inner peripheral wall 41, an annular outer peripheral wall 51, and a plurality of pillar portions 30 interconnecting the inner and outer peripheral walls 41 and 51 at intervals in a circumferential direction of the inner and outer peripheral walls 41 and 51 such that the inner cage 20 has a generally M-shaped cross-section. The inner cage 20 has a plurality of pockets 31 each formed between the adjacent pillar portions 30. A retaining projection 33a is formed on a radially-intermediate portion of each of opposed edges 33 of the adjacent pillar portions 30, and projects into the pocket 31, and also retaining projections 33b are formed respectively on radially-opposite end portions of each edge 33, and project into the pocket 31. The radially-outer cage 120 is similar in construction to the inner cage 20. More specifically, the outer cage 120 includes an annular inner peripheral wall 141, an annular outer peripheral wall 151, and a plurality of pillar portions 130 interconnecting the inner and outer peripheral walls 141 and 151 at intervals in a circumferential direction of the inner and outer peripheral walls 141 and 151 such that the outer cage 120 has a generally M-shaped cross-section. The outer cage 120 has a plurality of pockets 131 each formed between the adjacent pillar portions 130. A retaining projection 133a is formed on a radially-intermediate portion of each of opposed edges 133 of the adjacent pillar portions 130, and projects into the pocket 131, and also retaining projections 133b are formed respectively on radially-opposite end portions of each edge 133, and project into the pocket 131. This double row thrust roller bearing comprises a pair of races 60 and 70, a plurality of (i.e., two rows of) rollers 10 interposed between the pair of races 60 and 70, and the two rows of cages 20 and 120 holding the two rows of rollers 10, respectively, such that rollers 10 of each row are disposed at predetermined intervals in the circumferential direction.

A prior technique relating to double row thrust roller bearings of the type described is disclosed, for example, in JP-A-2006-194292.

However, in the above double row thrust roller bearing, an inner peripheral surface of the annular inner peripheral wall 41 of the inner cage 20 is guided by an annular flange 61 formed at an inner peripheral edge of the race 60 as shown in FIG. 5. Also, an outer peripheral surface of the annular outer peripheral wall 151 of the outer cage 120 is guided by an annular flange 71 formed at an outer peripheral edge of the other race 70. Therefore, a large clearance C develops between the annular outer peripheral wall 51 of the inner cage 20 and the annular inner peripheral wall 141 of the outer cage 120, and as a result when the two cages were thus provided in a double-row manner, there was encountered a problem that the dimension of the roller bearing in the radial direction was increased.

SUMMARY OF THE INVENTION

With the above problem in view, it is an object of this invention to provide a double row thrust roller bearing in which a dimension of the roller bearing in a radial direction is not unduly increased.

The above object has been achieved by a roller bearing of the present invention having the following features.

According to the first aspect of the invention, there is provided a double row thrust roller bearing comprising a pair of inner and outer cages arranged radially in two rows in separate coaxial relation and interposed between a pair of races, each cage including an annular inner peripheral wall, an annular outer peripheral wall, a plurality of pillar portions interconnecting the annular inner and outer peripheral walls at intervals in a circumferential direction of the annular inner and outer peripheral walls, and a plurality of pockets each formed between the adjacent pillar portions, wherein rollers are rotatably held and retained respectively in the pockets; characterized in that the annular inner peripheral wall of the inner cage is guided by an annular flange formed at an inner peripheral edge of one of the races; and the annular inner peripheral wall of the outer cage is guided by the annular outer peripheral wall of the inner cage.

In this construction, the outer cage is guided by the inner cage at its inner periphery, and therefore an unnecessary clearance will not develop between the two cages. Therefore, the dimension of the double row thrust roller bearing in the radial direction can be reduced.

The second aspect of the double row thrust roller bearing of the invention is characterized in that an inner peripheral surface of the annular inner peripheral wall of the outer cage is formed into a crowning shape such that a central portion thereof in a height direction thereof projects toward an outer peripheral surface of the annular outer peripheral wall of the inner cage or into a trapezoidal shape with inclined upper and lower portions of the inner peripheral surface in the height direction thereof such that the annular inner peripheral wall of the outer cage projects toward the outer peripheral surface of the annular outer peripheral wall of the inner cage while the upper and lower portions are thinned.

In this construction, the inner peripheral surface of the extension wall of the outer cage is guided by the outer peripheral surface of the annular outer peripheral wall of the inner cage. Therefore, even when wear develops on the two peripheral surfaces, an edge load (contracted load) will not develop thereon since the inner peripheral surface of the extension wall is formed into the crowning shape, and therefore the amount of wear of the two peripheral surfaces can be reduced. In addition, a variation developing on the two peripheral surfaces can be prevented. Furthermore, even when the two cages are inclined relative to each other, the development of an edge load can be prevented.

The third aspect of the double row thrust roller bearing of the invention is characterized in that a distal end portion of the annular inner peripheral wall of the outer cage is bent back to provide a double wall construction, and an inner peripheral surface of an extension wall formed as a result of bending the annular inner peripheral wall is formed into a crowning shape such that a central portion thereof in a height direction thereof projects toward the outer peripheral surface of the annular outer peripheral wall of the inner cage or into a trapezoidal shape with inclined upper and lower portions of the inner peripheral surface in the height direction thereof such that the annular inner peripheral wall of the outer gage projects toward the outer peripheral surface of the annular outer peripheral wall of the inner cage while the upper and lower portions are thinned.

In this construction, the distal end portion of the annular inner peripheral wall of the outer cage is bent back to provide the double wall construction. Therefore, the height of the annular inner peripheral wall (defining an outer wall portion of the double wall construction) can be set to such a value that the associated rollers will not be disengaged from the pockets. On the other hand, the height of the extension wall (defining an inner wall portion of the double wall construction) can be so set as to correspond to the height of the annular outer peripheral wall of the inner cage. Thus, these heights can be set in accordance with the rollers and the annular outer peripheral wall of the inner cage, respectively.

The fourth aspect of the double row thrust roller bearing of the invention is characterized in that an outer peripheral surface of the annular outer peripheral wall of the inner cage is formed into a crowning shape such that a central portion thereof in a height direction thereof projects toward an inner peripheral surface of the annular inner peripheral wall of the outer cage or into a trapezoidal shape with inclined upper and lower portions of the outer peripheral surface in the height direction thereof such that the annular outer peripheral wall of the inner cage projects toward the inner peripheral surface of the annular inner peripheral wall of the outer cage while the upper and lower portions are thinned.

In this construction, advantageous effects similar to those of the second aspect of the invention can be achieved.

The fifth aspect of the double row thrust roller bearing of the invention is characterized in that a distal end portion of the annular outer peripheral wall of the inner cage is bent back to provide a double wall construction, and an outer peripheral surface of an extension wall formed as a result of bending the annular outer peripheral wall is formed into a crowning shape such that a central portion thereof in a height direction thereof projects toward the inner peripheral surface of the annular inner peripheral wall of the outer cage or into a trapezoidal shape with inclined upper and lower portions of the outer peripheral surface in the height direction thereof such that the annular outer peripheral wall of the inner cage projects toward the inner peripheral surface of the annular inner peripheral wall of the outer cage while the upper and lower portions are thinned.

In this construction, advantageous effects similar to those of the third aspect of the invention can be achieved.

DETAILED DESCRIPTION OF THE PREFERRED EMBODIMENTS

A preferred embodiment of the present invention will now be described with reference to FIGS. 1 and 2.

Figure 1:
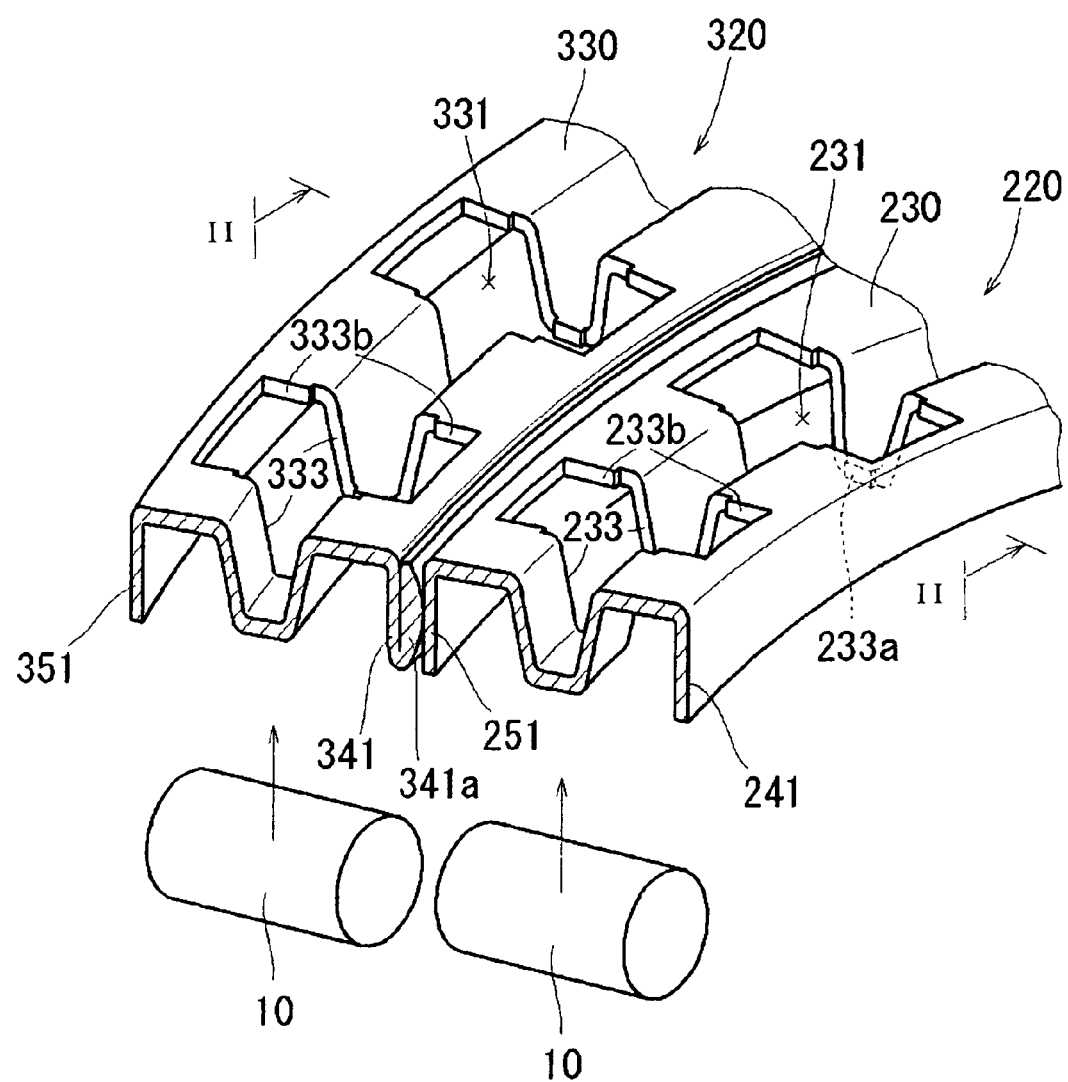
FIG. 1 is a perspective fragmentary view showing radially-inner and outer cages used in a preferred embodiment of a double row thrust roller bearing of the present invention.

FIG. 1 is a perspective fragmentary view showing radially-inner and outer cages used in a double row thrust roller bearing of the invention. FIG. 2 is a cross-sectional view taken along the line II-II of FIG. 1. FIGS. 3A and 3B are cross-sectional views of essential parts of modifications of the double row thrust roller bearing of the present invention.

This double row thrust roller bearing comprises a pair of races 60 and 70, a plurality of (i.e., two rows of) rollers 10 interposed between the pair of races 60 and 70, and cages 220 and 320 arranged in two rows and respectively holding the two rows of rollers 10 such that rollers 10 of each row are disposed at predetermined intervals in a circumferential direction.

Figure 2:
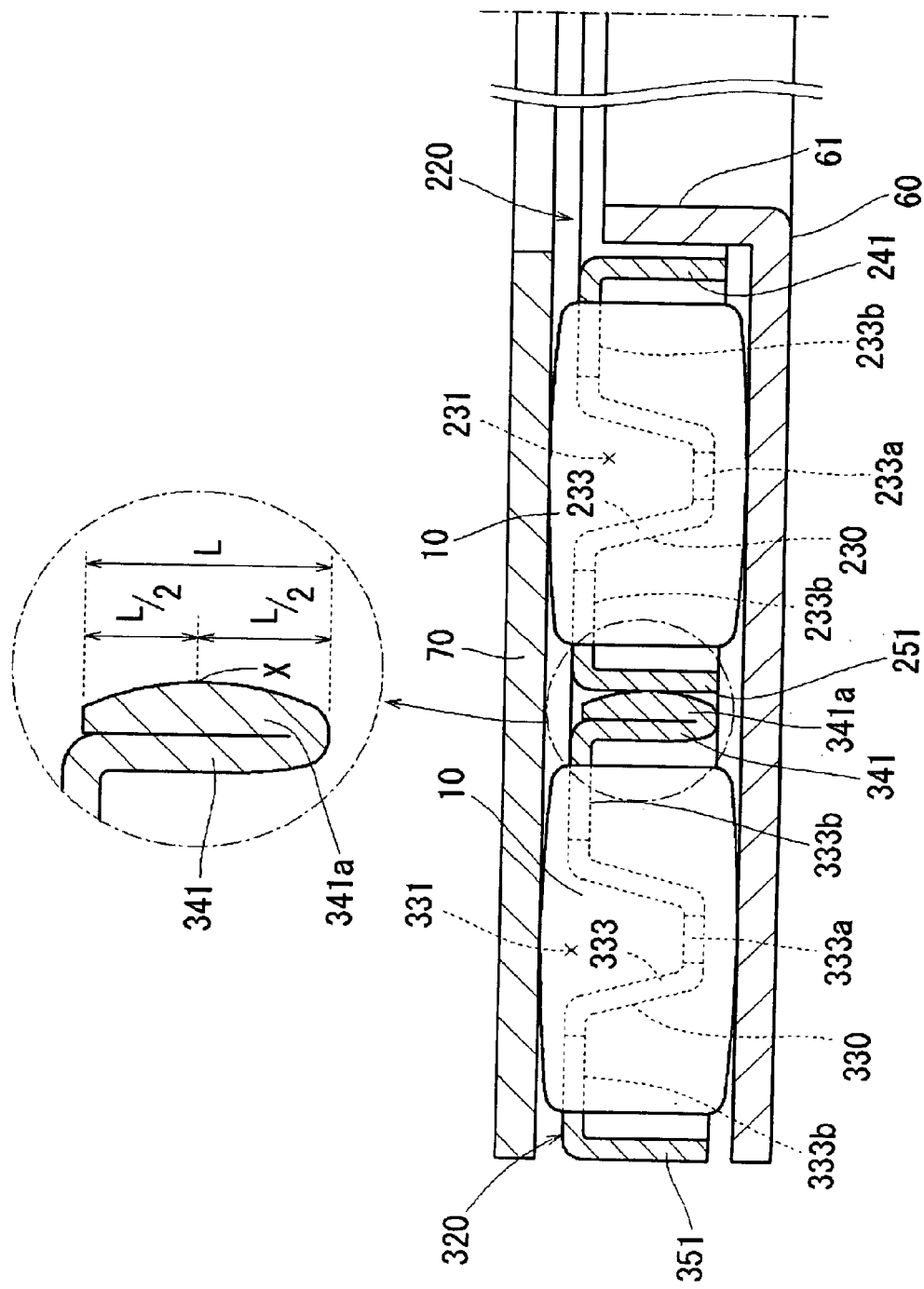
FIG. 2 is a cross-sectional view taken along the line II-II of FIG. 1.
Figure 3A:
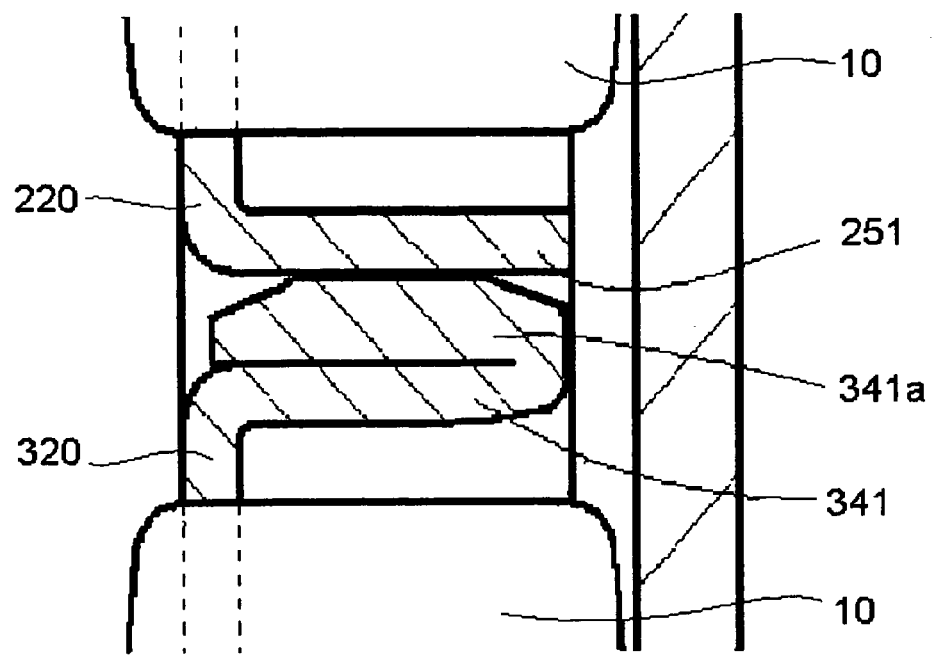
FIG. 3A is a cross-sectional view of an essential part of a modification of the double row thrust roller bearing of the present invention.
Figure 3B:
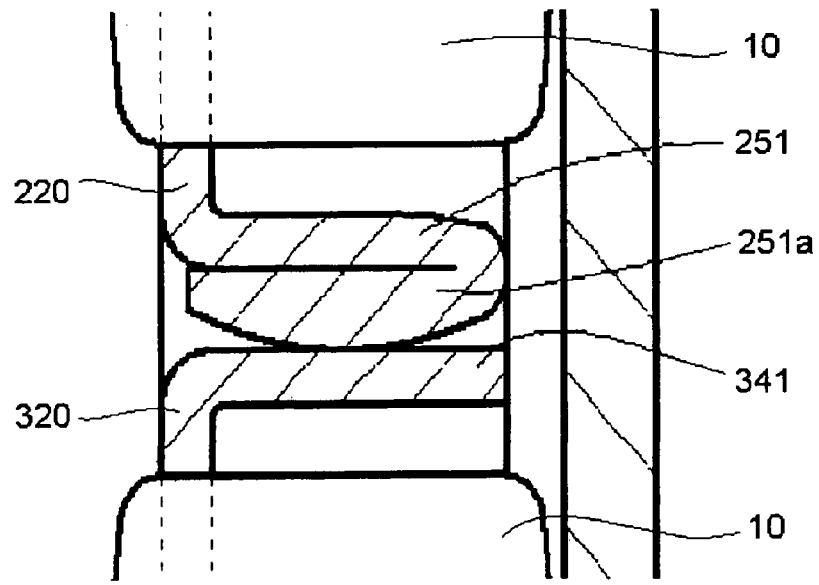
FIG. 3B is a cross-sectional view of an essential part of another modification of the double row thrust roller bearing of the present invention.
Figure 4:
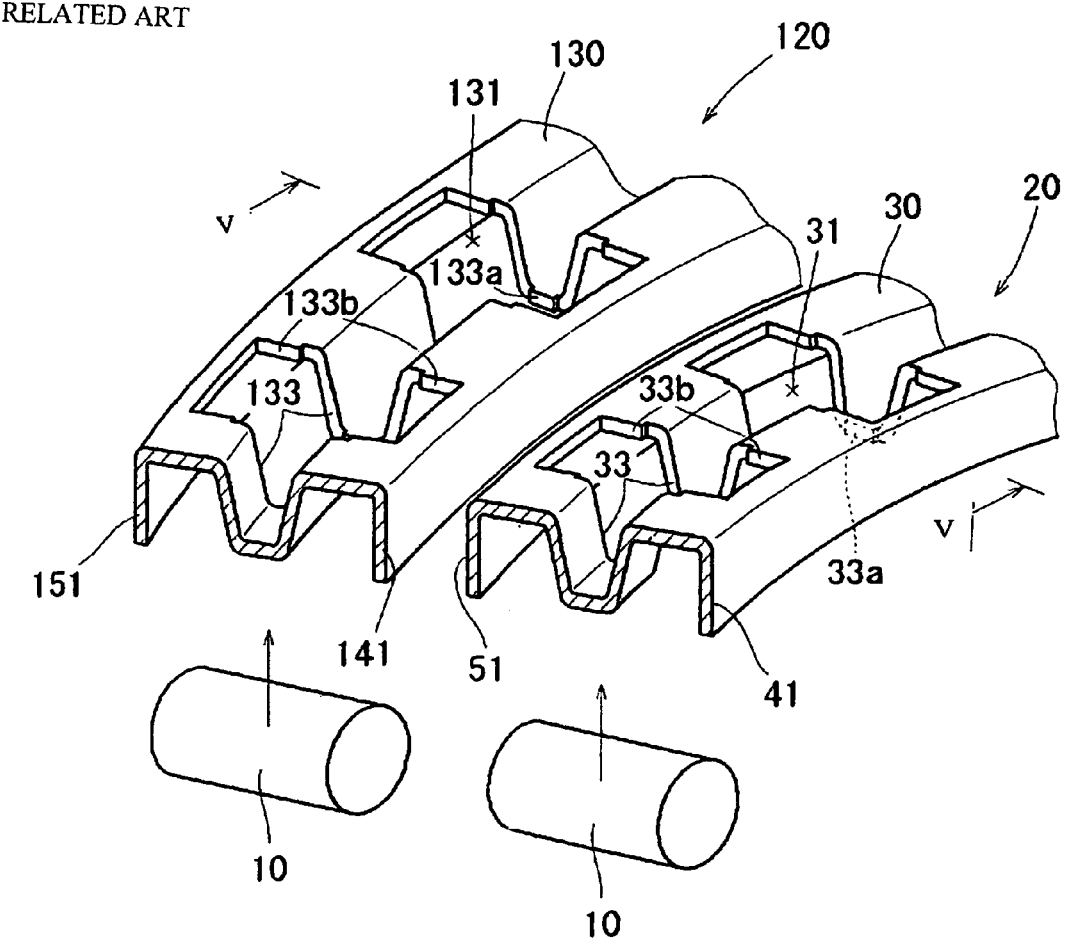
FIG. 4 is a view similar to FIG. 1, but showing a conventional double row thrust roller bearing.
Figure 5:
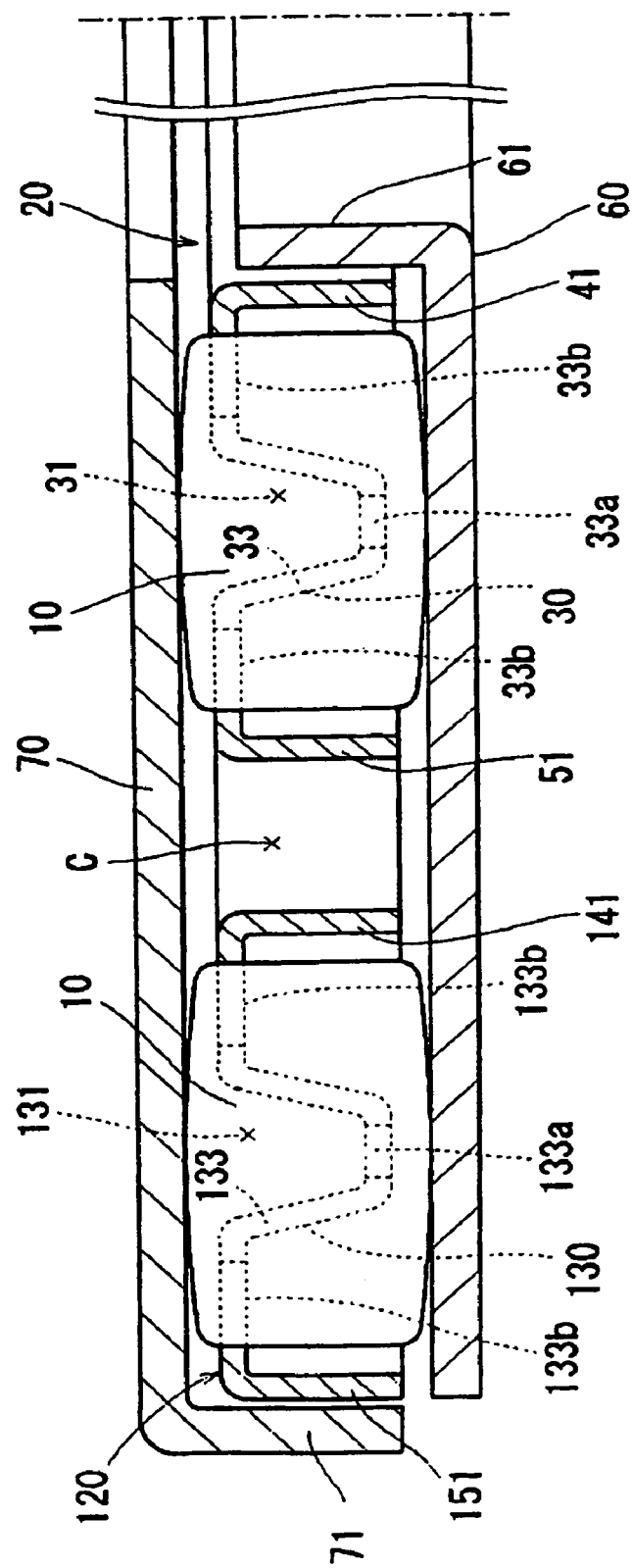
FIG. 5 is a cross-sectional view taken along the line V-V of FIG. 4.

As shown in FIGS. 1 and 2, the two cages 220 and 320 are arranged radially in two rows in separate coaxial relation, and the radially-inner cage 220 includes an annular inner peripheral wall 241, an annular outer peripheral wall 251, and a plurality of pillar portions 230 interconnecting the inner and outer peripheral walls 241 and 251 at intervals in the circumferential direction of the inner and outer peripheral walls 241 and 251 such that the inner cage 220 has a generally M-shaped cross-section. The inner cage 220 has a plurality of pockets 231 each formed between the adjacent pillar portions 230. A retaining projection 233a is formed on a radially-intermediate portion of each of opposed edges 233 of the adjacent pillar portions 230, and projects into the pocket 231, and also retaining projections 233b formed respectively on radially-opposite end portions of each edge 233, and project into the pocket 231.

The rollers 10 are rotatably held respectively in the pockets 231 of the inner cage 220, and are retained by the respective retaining projections 233a and 233b. Each roller 10 held in the pocket 231 is prevented by the retaining projections 233a (formed at the radially-intermediate portions) from being withdrawn from the pocket 231 toward one side in the axial direction, while the roller 10 is prevented by the retaining projections 233b (formed at the radially-opposite end portions) from being withdrawn from the pocket 231 toward the other side in the axial direction.

The radially-outer cage 320 is similar in construction to the inner cage 220. More specifically, the outer cage 320 includes an annular inner peripheral wall 341, an annular outer peripheral wall 351, and a plurality of pillar portions 330 interconnecting the inner and outer peripheral walls 341 and 351 at intervals in the circumferential direction of the inner and outer peripheral walls 341 and 351 such that the outer cage 320 has a generally M-shaped cross-section. The outer cage 320 has a plurality of pockets 331 each formed between the adjacent pillar portions 330. A retaining projection 333a is formed on a radially-intermediate portion of each of opposed edges 333 of the adjacent pillar portions 330, and projects into the pocket 331, and also retaining projections 333b are formed respectively on radially-opposite end portions of each edge 333, and project into the pocket 331.

The rollers 10 are rotatably held respectively in the pockets 331 of the outer cage 320, and are retained by the respective retaining projections 333a and 333b. Each roller 10 held in the pocket 331 is prevented by the retaining projections 333a (formed at the radially-intermediate portions) from being withdrawn from the pocket 331 toward the one side in the axial direction, while the roller 10 is prevented by the retaining projections 333b (formed at the radially-opposite end portions) from being withdrawn from the pocket 331 toward the other side in the axial direction.

A distal end portion of the annular inner peripheral wall 341 of the outer cage 320 is bent or folded back to provide a double wall construction. As is clear from an enlarged fragmentary view shown in FIG. 2, an inner peripheral surface of an extension wall 341a (formed as a result of bending the annular inner peripheral wall 341) is formed into a crowning shape such that a central portion X thereof in a height direction thereof projects or bulges toward an outer peripheral surface of the annular outer peripheral wall 251 of the inner cage 220. In this case, the height of the annular inner peripheral wall 341 is set to such a value that the associated rollers 10 will not be disengaged from the pockets 331. On the other hand, the height of the extension wall 341a is so set as to correspond to the height of the annular outer peripheral wall 251 of the inner cage 220.

The inner peripheral surface of the annular inner peripheral wall 241 of the inner cage 220 is guided by an annular flange 61 formed at an inner peripheral edge of the race 60. The inner peripheral surface of the extension wall 341a of the outer cage 320 is guided by the outer peripheral surface of the annular outer peripheral wall 251 of the inner cage 220.

The outer peripheral surface of the annular outer peripheral wall 251 of the inner cage 220 and/or the inner peripheral surface of the extension wall 341a of the outer cage 320 are covered with a coating layer with an excellent sliding property such as $MoS_2$ (molybdenum disulfide), silver, etc.

The inner cage 220 of the above construction is formed into an integral (or one-piece) construction by pressing a steel sheet, and simultaneously with or after this pressing operation, the pockets 231 are formed by stamping out relevant portions of this steel sheet, and simultaneously with this stamping operation, the retaining projections 233a and 233b are formed. Also, the outer cage 320 is formed in a similar manner.

The thrust roller bearing of this embodiment has the above construction.

In this construction, the outer cage 320 is guided by the inner cage 220 at its inner periphery, and therefore an unnecessary clearance will not develop between the two cages 220 and 320. Therefore, the dimension of the double row thrust roller bearing in the radial direction can be reduced.

Furthermore, in this construction, the inner peripheral surface of the extension wall 341a of the outer cage 320 is guided by the outer peripheral surface of the annular outer peripheral wall 251 of the inner cage 220. Therefore, even when wear develops on the two peripheral surfaces, an edge load (contracted load) will not develop thereon since the inner peripheral surface of the extension wall 341a is formed into the crowning shape, and therefore the amount of wear of the two peripheral surfaces can be reduced. In addition, a variation developing on the two peripheral surfaces can be prevented. Furthermore, even when the two cages 220 and 320 are inclined relative to each other, the development of an edge load can be prevented.

Furthermore, in this construction, the distal end portion of the annular inner peripheral wall 341 of the outer cage 320 is bent or folded back to provide the double wall construction. Therefore, the height of the annular inner peripheral wall 341 (defining the outer wall portion of the double wall construction) can be set to such a value that the associated rollers 10 will not be disengaged from the pockets 331. On the other hand, the height of the extension wall 341a (defining the inner wall portion of the double wall construction) can be so set as to correspond to the height of the annular outer peripheral wall 251 of the inner cage 220. Thus, these heights can be set in accordance with the rollers 10 and the annular outer peripheral wall 251, respectively.

The above embodiment merely shows a representative example of the present invention, and the invention is not limited to the above embodiment.

In the above embodiment, the inner peripheral surface of the extension wall 341a of the outer cage 320 is formed into the crowning shape such that the central portion X thereof in the height direction thereof projects or bulges toward the outer peripheral surface of the annular outer peripheral wall 251 of the inner cage 220. However, the invention is not limited to this construction, and the inner peripheral surface of the extension wall 341a can be formed into a trapezoidal shape with inclined upper and lower portions of this inner peripheral surface in the height direction thereof such that annular inner peripheral wall 341 (or the extension wall 341a) of the outer cage 320 projects or bulges toward the outer peripheral surface of the annular outer peripheral wall 251 of the inner cage 220 while the upper and lower portions are thinned as shown in FIG. 3A. In this case, also, similar advantageous effects to those of the above embodiment can be achieved.

Furthermore, in the above embodiment, the distal end portion of the annular inner peripheral wall 341 of the outer cage 320 is bent or folded back to provide the double wall construction, and the extension wall 341a is formed as a result of bending the annular inner peripheral wall 341, and the inner peripheral surface of the extension wall 341a is guided by the outer peripheral surface of the annular outer peripheral wall 251 of the inner cage 220. However, the invention is not limited to this construction, and instead of providing this extension wall 341a, there can be provided a construction in which the distal end portion of the annular outer peripheral wall 251 is bent or folded back to provide a double wall construction such that an extension wall 251a is formed as a result of bending the annular outer peripheral wall 251, and an outer peripheral surface of this extension wall 251a is guided by the inner peripheral surface of the annular inner peripheral wall 341 of the outer cage 320 as shown in FIG. 3B. In this case, also, advantageous effects similar to those of the above embodiment can be achieved.

What is claimed is:

1. A double row thrust roller bearing comprising:
a pair of inner and outer cages arranged radially in two rows in separate coaxial relation and interposed between a pair of races, each cage including an annular inner peripheral wall, an annular outer peripheral wall, a plurality of pillar portions interconnecting said annular inner and outer peripheral walls at intervals in a circumferential direction of said annular inner and outer peripheral walls, and a plurality of pockets each formed between the adjacent pillar portions, wherein rollers are rotatably held and retained respectively in said pockets,
wherein said annular inner peripheral wall of said inner cage is guided by an annular flange formed at an inner peripheral edge of one of said races, and
wherein said annular inner peripheral wall of said outer cage is guided by said annular outer peripheral wall of said inner cage.

2. A double row thrust roller bearing according to claim 1, wherein the annular inner peripheral wall of the outer cage is disposed radially outward of the annular outer peripheral wall of the inner cage.

3. A double row thrust roller bearing according to claim 1, wherein a radially innermost portion of the annular inner peripheral wall of said outer cage is disposed radially outward of a radially outermost portion of the annular outer peripheral wall of the inner cage.

4. A double row thrust roller bearing according to claim 1, wherein an inner peripheral surface of said annular inner peripheral wall of said outer cage is diametrically guided by an outer peripheral surface of said annular outer peripheral wall of said inner cage.

5. A double row thrust roller bearing according to claim 1, wherein said annular inner peripheral wall of said outer cage abuts said annular outer peripheral wall of said inner cage.

6. A double row thrust roller bearing according to claim 1, wherein said inner cage is disposed radially inward of said outer cage.

7. A double row thrust roller bearing comprising:
a pair of inner and outer cages arranged radially in two rows in separate coaxial relation and interposed between a pair of races, each cage including an annular inner peripheral wall, an annular outer peripheral wall, a plurality of pillar portions interconnecting said annular inner and outer peripheral walls at intervals in a circumferential direction of said annular inner and outer peripheral walls, and a plurality of pockets each formed between the adjacent pillar portions, wherein rollers are rotatably held and retained respectively in said pockets,
wherein said annular inner peripheral wall of said inner cage is guided by an annular flange formed at an inner peripheral edge of one of said races,
wherein said annular inner peripheral wall of said outer cage is guided by said annular outer peripheral wall of said inner cage, and
wherein an inner peripheral surface of said annular inner peripheral wall of said outer cage is formed into a crowning shape such that a central portion thereof in a height direction thereof projects toward an outer peripheral surface of said annular outer peripheral wall of said inner cage or into a trapezoidal shape with inclined upper and lower portions of said inner peripheral surface in the height direction thereof such that the annular inner peripheral wall of said outer cage projects toward the outer peripheral surface of said annular outer peripheral wall of said inner cage while the upper and lower portions are thinned.

8. A double row thrust roller bearing according to claim 7, wherein a distal end portion of said annular inner peripheral wall of said outer cage is bent back to provide a double wall construction, and an inner peripheral surface of an extension wall formed as a result of bending said annular inner peripheral wall is formed into the crowning shape or the trapezoidal shape.

9. A double row thrust roller bearing according to claim 7, wherein said annular inner peripheral wall of said outer cage abuts said annular outer peripheral wall of said inner cage.

10. A double row thrust roller bearing according to claim 7, wherein said inner cage is disposed radially inward of said outer cage.

11. A double row thrust roller bearing comprising:
a pair of inner and outer cages arranged radially in two rows in separate coaxial relation and interposed between a pair of races, each cage including an annular inner peripheral wall, an annular outer peripheral wall, a plurality of pillar portions interconnecting said annular inner and outer peripheral walls at intervals in a circumferential direction of said annular inner and outer peripheral walls, and a plurality of pockets each formed between the adjacent pillar portions, wherein rollers are rotatably held and retained respectively in said pockets,
wherein said annular inner peripheral wall of said inner cage is guided by an annular flange formed at an inner peripheral edge of one of said races,
wherein said annular inner peripheral wall of said outer cage is guided by said annular outer peripheral wall of said inner cage, and
wherein an outer peripheral surface of said annular outer peripheral wall of said inner cage is formed into a crowning shape such that a central portion thereof in a height direction thereof projects toward an inner peripheral surface of said annular inner peripheral wall of said outer cage or into a trapezoidal shape with inclined upper and lower portions of said outer peripheral surface in the height direction thereof such that the annular outer peripheral surface of said inner cage projects toward the inner peripheral surface of said annular inner peripheral wall of said outer cage while the upper and lower portions are thinned.

12. A double row thrust roller bearing according to claim 11, wherein a distal end portion of said annular outer peripheral wall of said inner cage is bent back to provide a double wall construction, and an outer peripheral surface of an extension wall formed as a result of bending said annular outer peripheral wall is formed into the crowning shape or the trapezoidal shape.

13. A double row thrust roller bearing according to claim 11, wherein said annular inner peripheral wall of said outer cage abuts said annular outer peripheral wall of said inner cage.

14. A double row thrust roller bearing according to claim 11, wherein said inner cage is disposed radially inward of said outer cage.

* * * * *